(12) United States Patent
Bose et al.

(10) Patent No.: US 7,979,866 B2
(45) Date of Patent: Jul. 12, 2011

(54) MONITORING MESSAGES IN A DISTRIBUTED DATA PROCESSING SYSTEM

(75) Inventors: Anuradha A. Bose, Cedar Park, TX (US); Michael R. Meli, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 604 days.

(21) Appl. No.: 12/059,532

(22) Filed: Mar. 31, 2008

(65) Prior Publication Data
US 2008/0172676 A1 Jul. 17, 2008

Related U.S. Application Data

(63) Continuation of application No. 11/014,059, filed on Dec. 16, 2004, now abandoned.

(51) Int. Cl.
*G06F 9/46* (2006.01)
*G06F 11/00* (2006.01)
(52) U.S. Cl. .................................. 719/314; 714/47
(58) Field of Classification Search .................. 714/47; 719/314

See application file for complete search history.

(56) References Cited

U.S. PATENT DOCUMENTS

| 7,194,664 B1 * | 3/2007 | Fung et al. | 714/45 |
| 7,496,903 B2 * | 2/2009 | Rees et al. | 717/130 |
| 2003/0195959 A1 * | 10/2003 | Labadie et al. | 709/224 |

* cited by examiner

*Primary Examiner* — Li B Zhen
*Assistant Examiner* — Charles E Anya
(74) *Attorney, Agent, or Firm* — Jeffrey S. LaBaw; Biggers & Ohanian, PLLC (57) ABSTRACT

Methods, systems, and products are provided for monitoring messages in a distributed data processing system. Embodiments typically include putting a message containing a monitoring token on a queue on a server; receiving a call to get the message from the queue on the server; determining, with an API exit running on the server, whether the call to get the message is made by a process running on a remote client or by a process running on the server; and if the call to get the message is made by a process running on the server, removing the monitoring token from the message with the API exit. Many embodiments also include removing the monitoring token from the message with a channel exit running on the remote client, if the call to get the message is made by a process on the remote client.

15 Claims, 6 Drawing Sheets

MONITORING MESSAGES IN A DISTRIBUTED DATA PROCESSING SYSTEM

CROSS-REFERENCE TO RELATED APPLICATION

This application is a continuation application of and claims priority from U.S. patent application Ser. No. 11/014,059, filed on Dec. 16, 2004.

BACKGROUND OF THE INVENTION

1. Field of the Invention

The field of the invention is data processing, or, more specifically, methods, systems, and products for monitoring messages in a distributed data processing system.

2. Description of Related Art

Message oriented middleware ("MOM") implements methods of communication between software components or applications. MOM systems implement both point-to-point functionality and publish-subscribe functionality. In a point-to-point domain, one source application (a 'producer') produces messages for one destination application (a 'consumer'). Such a MOM system is often envisioned as a peer-to-peer facility in that any client application may function as either a producer or consumer depending on its function at any particular time. In client-server terms, that is, any client can produce or consume messages to or from any other client. Each MOM client typically connects to a messaging agent (sometimes called a 'queue manager') that provides facilities for creating, sending, receiving, and reading messages.

MOM systems support distributed data communication that is loosely coupled and generally asynchronous. A producer component sends a message to a destination (typically a message queue), and a consumer recipient can retrieve the message from the destination. The producer and the consumer are not required to be available, either on-line or connected to one another for data communications in order to communicate. In fact, the producer does not need to know anything about the consumer, nor does the consumer need to know anything about the producer. The producer and consumer need to know only what message format and what destination (or message queue) to use. In this respect, messaging differs from tightly coupled technologies, such as the Common Object Request Broker Architecture ("CORBA") or Java's Remote Method Invocation ("RMI"), which require a calling application to know a remote application's methods.

A "message" is a unit of information transmitted electronically from one computer application to another. Examples of messages generally include email messages and messages in data communications protocols such as HTTP or TCP/IP. Many messages in embodiments according to the present invention are units of information communicated in message oriented middleware ("MOM"). MOM messages differ somewhat from many other kinds of messages. Email messages, for example, implement human-readable communications from a person to a person or from a software application to a person. HTTP messages represent requests for particular computer resources and responses to such requests. A MOM messages, however, is used for communications between software applications and other software applications to implement business logic. That is, a MOM message generally communicates input data for, or output data from, operation of some form of business logic, accounting, on-line sales or marketing, financial calculations, security services, and so on. Examples of MOM systems include IBM's MQSeries products, JMS (the Java Message Service), and MSMQ (Microsoft Message Queuing).

As mentioned above, a MOM message generally communicates input data for, or output data from, operation of some form of business logic. Monitoring tools are currently available to monitor the performance of messaging systems by externally monitoring factors that affect messaging. Such conventional monitoring tools are currently available from a number of companies such as BMC Software™, Bristol™, Nastel™, QPasa™, Reconda™, and others that will occur to those of skill in the art. These conventional messaging monitoring tools do not use techniques available for monitoring other types of transactions that include embedding a transaction monitoring token at the beginning of a transaction and passing the monitoring token with each stage of a transaction or with each transaction. In such transaction monitoring tools, the transaction monitoring token is typically a data structure containing information defining the type of transaction being monitored, metrics used to measure the performance of the transaction, as well as information about the process engaged in the transaction. One such transaction monitoring application currently available is Tivoli Monitoring for Transaction Performance Version 5.1 ("TMTP™") available from IBM®.

Conventional messaging systems do not provide for embedding a transaction monitoring token within the message at the source of the message and extracting the monitoring token at the destination because they do not provide a mechanism to embed the monitoring token into the message itself and they do not provide a mechanism to determine whether a consuming process is running on a remote client (in which case the remote client is the location where the monitoring token should be removed) or whether the consuming process is running on the server itself (in which case the server is where the monitoring token should be removed). There is therefore an ongoing need for improved methods, systems, and products for monitoring messages in a distributed data processing system capable of determining whether a call to get a message on a queue is made by a consuming process running on a remote client or by a consuming process running on the server and if the call to get the message is made by a process running on the server removing a monitoring token from the message.

SUMMARY OF THE INVENTION

Methods, systems, and products are provided for monitoring messages in a distributed data processing system. Embodiments typically include putting a message containing a monitoring token on a queue on a server; receiving a call to get the message from the queue on the server; determining, with an API exit running on the server, whether the call to get the message is made by a process running on a remote client or by a process running on the server; and if the call to get the message is made by a process running on the server, removing the monitoring token from the message with the API exit. Many embodiments also include removing the monitoring token from the message with a channel exit running on the remote client, if the call to get the message is made by a process on the remote client.

Some embodiments include inserting, with a channel exit running on a remote client, the monitoring token in the message. In many such embodiments, inserting, with a channel exit running on a remote client, the monitoring token in the message is carried out by calling an ARM API.

Some embodiments include inserting, with an API exit running on the server, the monitoring token in the message. In many such embodiments, inserting, with an API exit running on the server, the monitoring token in the message is carried out by calling an ARM API.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

The present invention is described to a large extent in this specification in terms of methods for monitoring messages in a distributed data processing system. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit.

The invention also may be embodied in a computer program product, such as a diskette or other recording medium, for use with any suitable data processing system. Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Monitoring Messages in a Distributed Data Processing System

Figure 1:
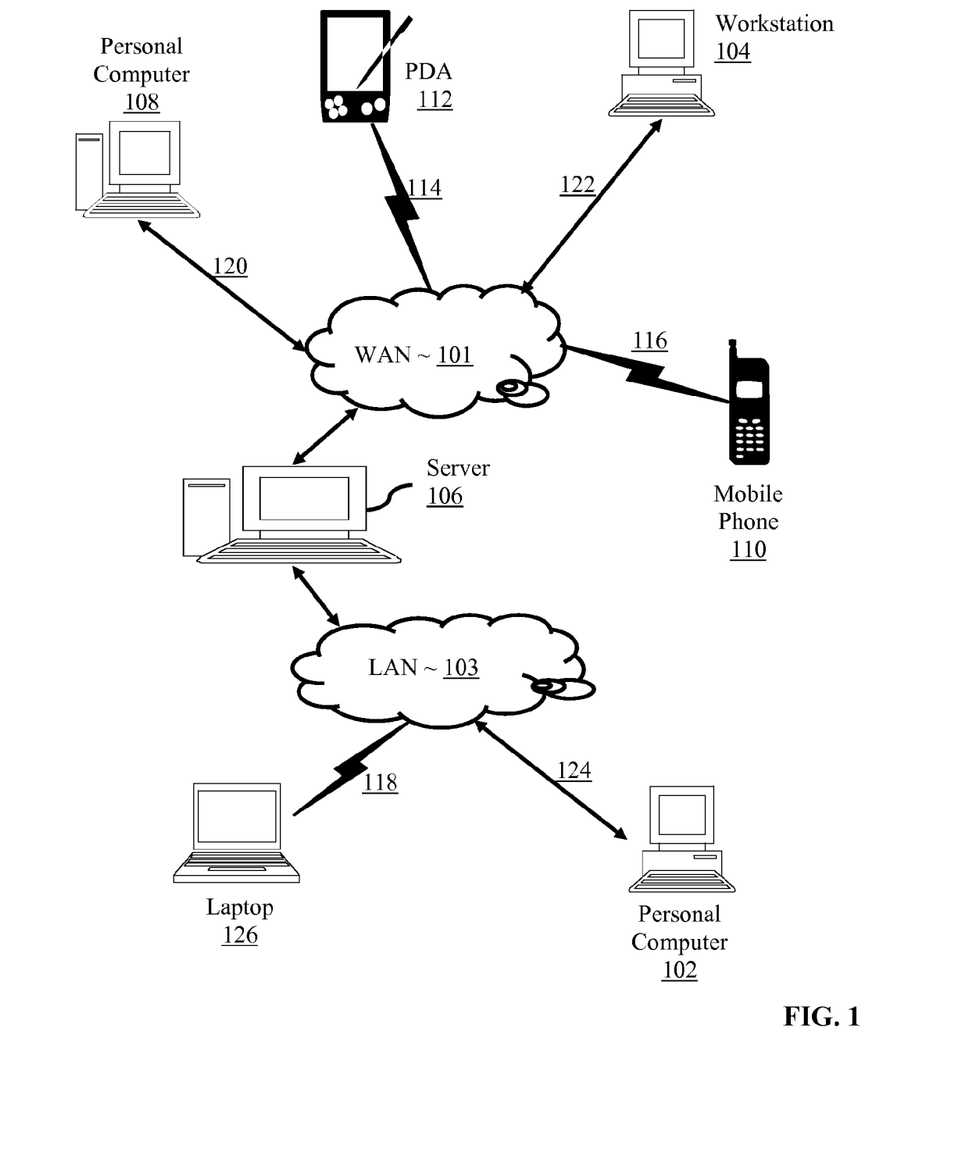
FIG. 1 depicts an exemplary data processing system capable of monitoring messages according to embodiments of the present invention.

Exemplary methods, systems, and products for monitoring messages in a distributed data processing system are now explained with reference to the accompanying drawings, beginning with FIG. 1. FIG. 1 depicts an exemplary data processing system capable of monitoring messages according to embodiments of the present invention. The system of FIG. 1 includes a number of computers connected for data communications in networks. Each of the computers of the system of FIG. 1 is capable of monitoring messages in a distributed data processing system through the use of monitoring tokens inserted into messages at the source of the message and removing monitoring tokens at destination of the message. The data processing system of FIG. 1 includes wide area network ("WAN") (101) and local area network ("LAN") (103). The network connection aspect of the architecture of FIG. 1 is only for explanation, not for limitation. In fact, systems for monitoring messages in a distributed data processing system according to embodiments of the present invention may be connected as LANs, WANs, intranets, internets, the Internet, webs, the World Wide Web itself, or other connections as will occur to those of skill in the art. Such networks are media that may be used to provide data communications connections between various devices and computers connected together within an overall data processing system.

In the example of FIG. 1, server (106) implements a gateway, router, or bridge between LAN (103) and WAN (101). In the example of FIG. 1, the server (106) is capable of monitoring messages in a distributed data processing system according to embodiments of the present invention. In a distributed processing system such as the exemplary system of FIG. 1, it is not uncommon for messages to reside in intermediary message queues on intermediary computers between the producer of the message and the consumer of the message. Often such messages, pass through one or more intermediate queue managers when there is no direct communication link between a source queue manager and the target queue manager. Such messages are said to 'hop' between the producing process and the consuming process. Monitoring such systems through the use of a monitoring token embedded in the message present a specific challenge because the monitoring token must be removed at the destination. That is, the consuming process must remove the monitoring token. When messages reside in intermediate queues, or hop between the producer and the consumer, and consuming processes are currently running on both a client and the server itself, it must be determined whether a message is retrieved by the destination consuming process on the remote client or the server. When the destination consuming process is running on the server, the server is the destination and a monitoring token should be removed. When the destination consuming process is running on a remote client, the client is the destination—not the server—and the monitoring token should be removed at the client instead.

The server (106) of FIG. 1 is capable receiving a call to get a message containing a monitoring token from a queue on the server (106), determining with an API exit running on the server whether the call to get the message is made by a process running on a remote client or by a process running on the server (106) itself. If the call to get the message is made by a process running on the server (106), the exemplary server (106) of FIG. 1 is capable of removing the monitoring token from the message with the API exit. An 'API exit' is software running on a server that modifies typical MOM calls. For such modified MOM calls issued by an application, the API exit is invoked before the queue manager starts to process the call and again after the queue manager has completed processing the call. In the example of FIG. 1 the API exit is invoked on the server by a call to get the message from the queue made either by a process on the server of by a process on a remote client. The API exit is then programmed to determine whether the call to get the message is made by a process running on a remote client or by a process running on the server itself. If the call to get the message is made by a process running on the server, the API exit is programmed to remove a monitoring token from the message prior to passing the message to the consuming process running on the remote client.

In the example of FIG. 1, several exemplary remote client devices including a PDA (112), a computer workstation (104), a mobile phone (110), and personal computer (108) are connected for data communication to the server (106) through a WAN (101). A network-enabled mobile phone (110) connects to the WAN (101) through a wireless link (116), and a PDA (112) connects to the WAN (101) through a wireless link (114). In the example of FIG. 1, a personal computer (108) connects through a wireline connection (120) to the WAN (101), and the computer workstation (104) connects through a wireline connection (122) to the WAN (101). In the example of FIG. 1, several remote client devices such as a laptop (126) and a personal computer (102) are connected for data communications to the server (106) through a LAN (103). The laptop (126) connects through a wireless link (118) to the LAN (103), and a personal computer (102) connects through a wireline connection (124) to the LAN (103).

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP/IP, HTTP, WAP, HDTP, and others as will occur to those of skill in the art. Various embodiments of the present invention may be implemented on a variety of hardware platforms in addition to those illustrated in FIG. 1.

Figure 2:
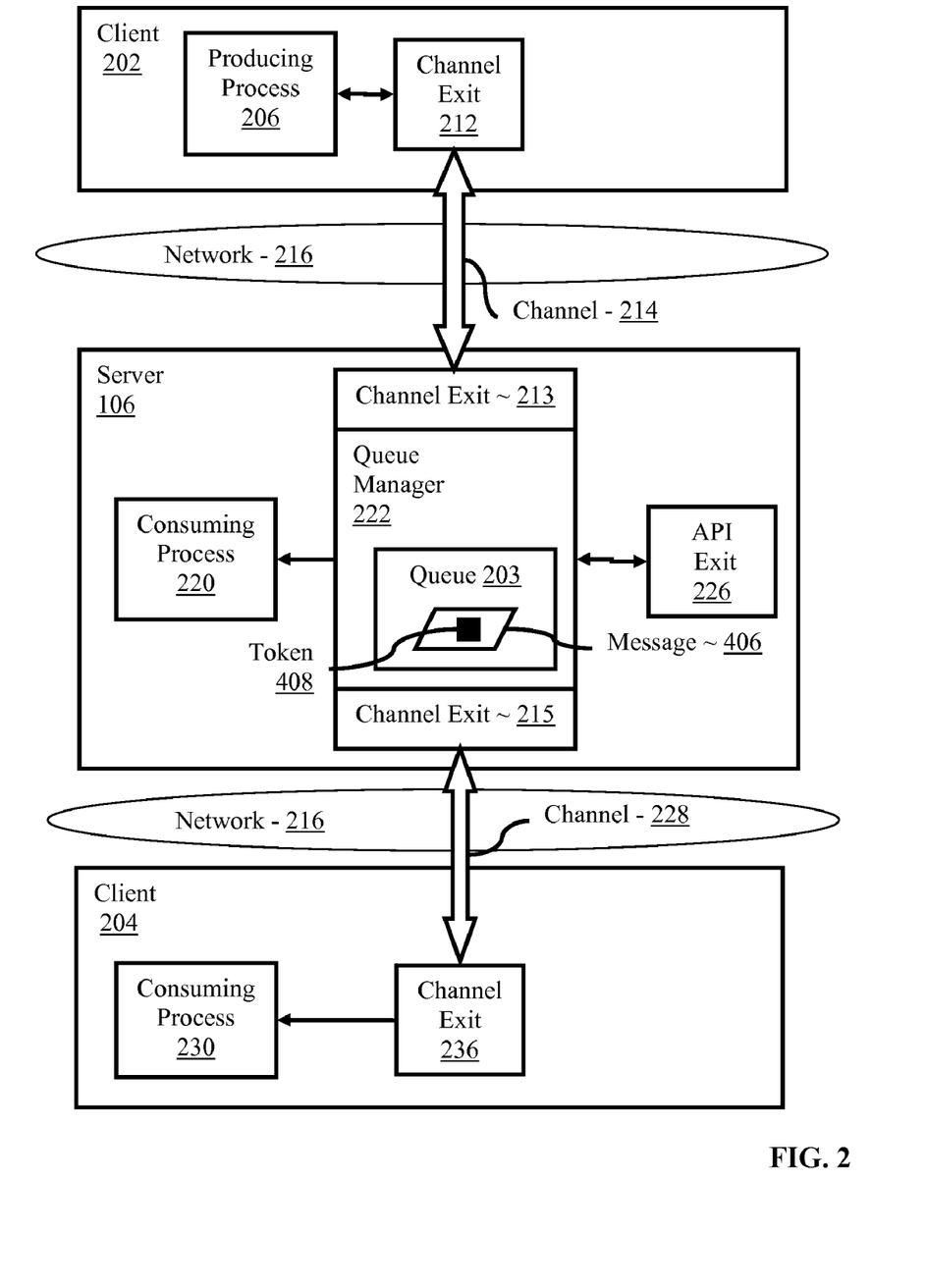
FIG. 2 sets forth a line drawing of an exemplary computer architecture useful in monitoring messages in a distributed data processing system according to embodiments of the present invention.

For further explanation, FIG. 2 sets forth a line drawing of an exemplary computer architecture useful in monitoring messages in a distributed data processing system according to embodiments of the present invention. More particularly, FIG. 2 describes an exemplary architecture for a message oriented middleware system as may be implemented, for example, with IBM's MQSeries products, JMS (Java Message Service), the MSMQ (Microsoft Message Queuing), or other messaging systems as will occur to those of skill in the art. The architecture of FIG. 2 includes a remote client (202) connected for data communications through network (216) to server (106) upon which is installed a message queue manager (222) that administers the operation of a message queue (203). A message queue (203) is a multi-element data structure in which messages may be stored and removed.

In the example of FIG. 2, a producing process (206) is running on the client (202). The exemplary producing process (206) is a computer application program that implements business logic and sends messages through channel exit (212) running on the remote client (202), on the remote client, a data communications channel (214) and a channel exit (213) on the server (106) to a queue manager (212) on the server and then to the queue (203). The channel exit (212) running on the remote client (202) inserts a monitoring token within the message prior to putting the message on the queue (203). A 'channel exit' is software running on the remote client (202) that modifies a typical MOM calls. For such a modified MOM calls issued by a producing process, the channel exit is invoked before processing the call. In the example of FIG. 2, before putting the message on the queue (203) the invoked channel exit (212) inserts a monitoring token into the message.

A consuming process, also a computer application program implementing business logic, gets the message from the queue (203). Consuming processes take as inputs messages from a queue through a queue manager and may return output messages through the queue manager to the queue. In retrieving messages from queues and processing the messages according to business logic, consumer applications in this specification are said to "consume" messages. In the example of FIG. 2, two consuming processes are depicted. One consuming process (220) is running on the server (106) and takes as inputs messages from the queue (203) through the queue manager (222) installed on the server (106). In the example of FIG. 2, another consuming process (230) is running on another remote client (204) and takes as inputs messages from the same queue (203) through a channel exit (236) installed on the remote client (204).

In the example of FIG. 2, upon receiving a call to get the message containing the monitoring token from the queue (203) the queue manager (222) is programmed to determine, with an API exit (226) running on the server (106), whether the call to get the message (406) is made by a process (230) running on a remote client (204) or by a process (220) running on the server (106). If the call to get the message (406) is made by a process (220) running on the server (106), the queue manager of FIG. 2 is programmed to remove the monitoring token (408) from the message (406) with the API exit (226) before passing the message to the consuming process (220).

In the example of FIG. 2, if the call to get the message (406) is made by the consuming process (230) on the remote client (204), the queue manager (222) does not remove the token (408) because the server (106) is not the destination. Instead, the queue manager (222) passes the message to the channel exit (236) installed on the remote client (204). In the example of FIG. 2, the channel exit (236) running on the remote client removes the monitoring token (408) from the message (406) prior to passing the message to the consuming process (230).

Figure 3:
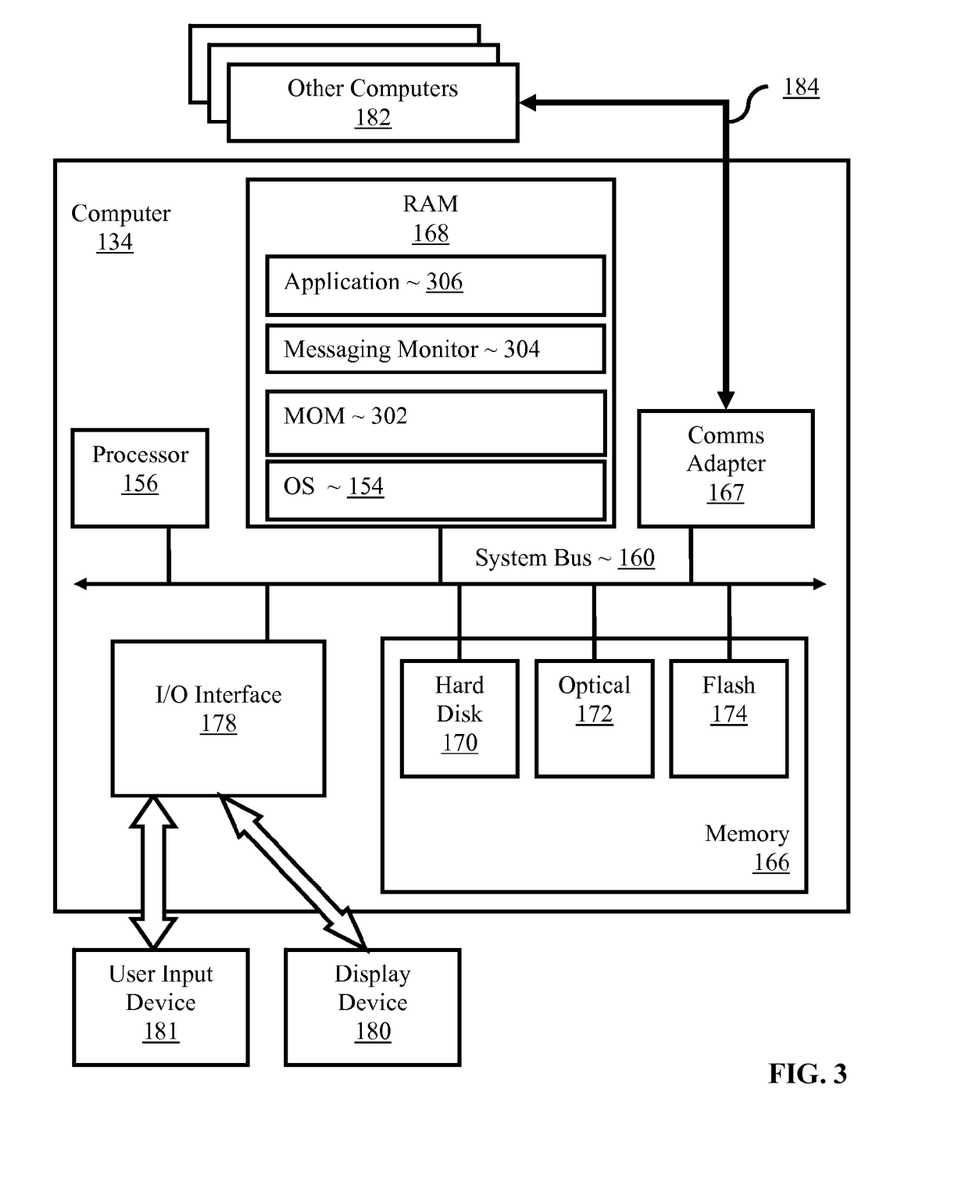
FIG. 3 sets forth a block diagram of automated computing machinery useful in monitoring messages in a distributed data processing system according to embodiments of the present invention.

As mentioned above, monitoring messages in a distributed data processing system in accordance with the present invention is generally implemented with computers, that is, with automated computing machinery. For further explanation, FIG. 3 sets forth a block diagram of automated computing machinery comprising a computer (134) useful in monitoring messages in a distributed data processing system according to embodiments of the present invention. The computer (134) of FIG. 3 includes at least one computer processor (156) or 'CPU' as well as random access memory (168) ("RAM"). Stored in RAM (168) is an operating system (154). Operating systems useful in computers according to embodiments of the present invention include Unix, Linux, Microsoft NT™, and many others as will occur to those of skill in the art. Operating system (154) in the example of FIG. 3 is shown in RAM (168), but many components of an operating system typically are stored in non-volatile memory (166) also.

Also stored in RAM (168) is message-oriented middleware (302). Message oriented middleware ("MOM") implements methods of communication between software components or applications (306). MOM system implement both point-to-point functionality and publish-subscribe functionality. Examples of MOM systems include IBM's MQSeries products, JMS (the Java Message Service), and MSMQ (Microsoft Message Queuing).

Also stored in RAM (168) a messaging monitoring tool (304). Message monitoring is often provided by a transaction monitoring application, such as for example, Tivoli Monitoring for Transaction Performance Version 5.1 ("TMTP™") available from IBM®, modified in accordance with embodiments of the present invention. The exemplary message monitoring tool (304) of FIG. 3 is capable of monitoring messaging by inserting at the source of a message a monitoring token and extracting the monitoring token from the message at the destination. The monitoring token is typically a data structure containing information defining the type of transaction being monitored (such as messaging for example), metrics used to measure the performance of the transaction, as well as information about the process inserting the token within the message. In TMTP, the monitoring token is typically called a 'correlator' that is returned by invoking a call into the ARM Application Programming Interface ('API'). 'ARM' is an open API for Application Response-time Measurement useful in messaging monitoring that provides API's for obtaining measuring tokens, called 'correlators.'

Also stored in RAM is an application (168). The exemplary application (168) of FIG. 3 is a computer application program that implements business logic and sends and receives messages by use of messaging oriented middleware.

The computer (134) of FIG. 3 includes non-volatile computer memory (166) coupled through a system bus (160) to processor (156) and to other components of the computer. Non-volatile computer memory (166) may be implemented as a hard disk drive (170), optical disk drive (172), electrically erasable programmable read-only memory space (so-called 'EEPROM' or 'Flash' memory) (174), RAM drives (not shown), or as any other kind of computer memory as will occur to those of skill in the art.

The exemplary computer (134) of FIG. 3 includes a communications adapter (167) for implementing connections for data communications (184), including connections through networks, to other computers (182), including servers, clients, and others as will occur to those of skill in the art. Communications adapters implement the hardware level of connections for data communications through which local devices and remote devices or servers send data communications directly to one another and through networks. Examples of communications adapters useful for monitoring messages in a distributed data processing system according to embodiments of the present invention include modems for wired dial-up connections, Ethernet (IEEE 802.3) adapters for wired LAN connections, and 802.11b adapters for wireless LAN connections.

The example computer of FIG. 3 includes one or more input/output interface adapters (178). Input/output interface adapters in computers implement user-oriented input/output through, for example, software drivers and computer hardware for controlling output to display devices (180) such as computer display screens, as well as user input from user input devices (181) such as keyboards and mice.

Figure 4:
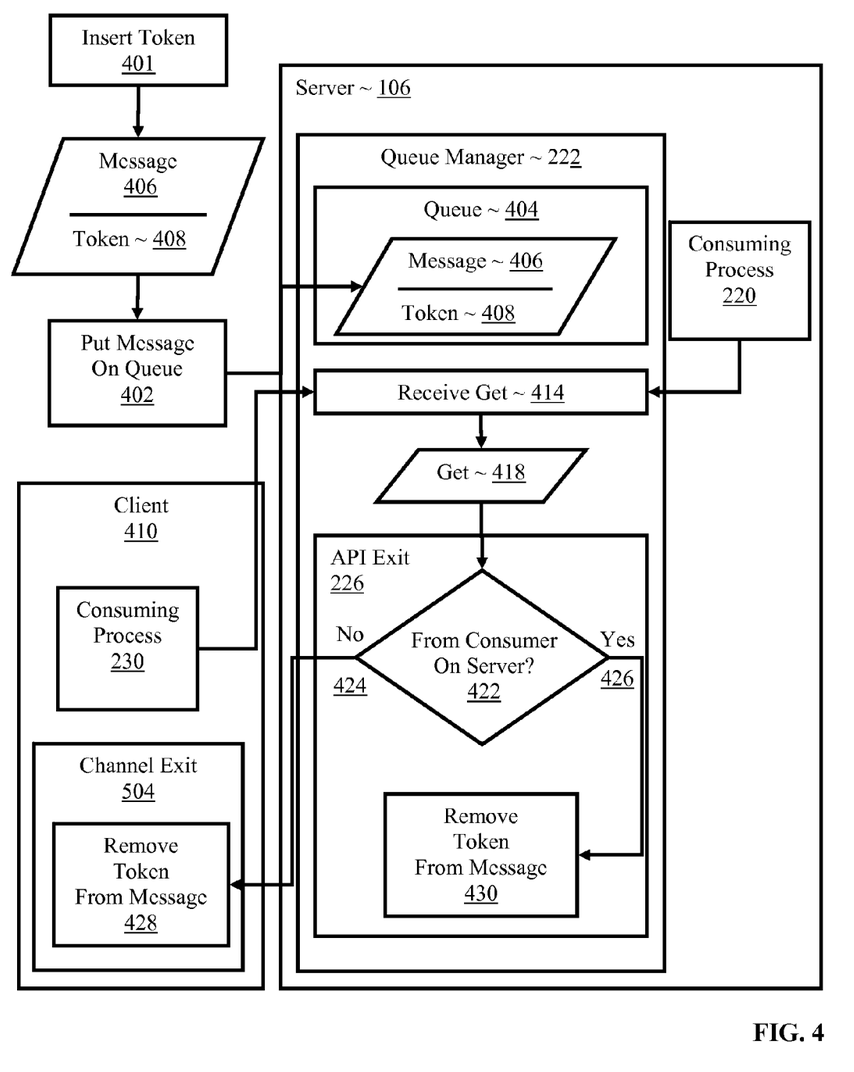
FIG. 4 sets forth a flow chart illustrating an exemplary method for monitoring messages in a distributed data processing system.

For further explanation, FIG. 4 sets forth a flow chart illustrating an exemplary method for monitoring messages in a distributed data processing system that includes inserting (401) a monitoring token (408) into a message (406). Inserting (401) a monitoring token (408) into a message (406) is carried out by a producing process at the source of the message which may run on either a client or a server. For further explanation therefore, FIG. 5 sets forth a data flow diagram illustrating an exemplary method for inserting a monitoring token (408) in a message (406) by use of a channel exit running on a remote client device. In example of FIG. 5, the channel exit is software running on the remote client that modifies a typical MOM put call, such as MQPUT or MQPUT1 in MQSeries. When a put call is issued by a producing process running on the client the channel exit (504) is invoked prior to putting the message on the queue. The method of FIG. 5 includes inserting (506), with the channel exit (504) running on the remote client (410), a monitoring token (408) in the message (406).

Figure 5:
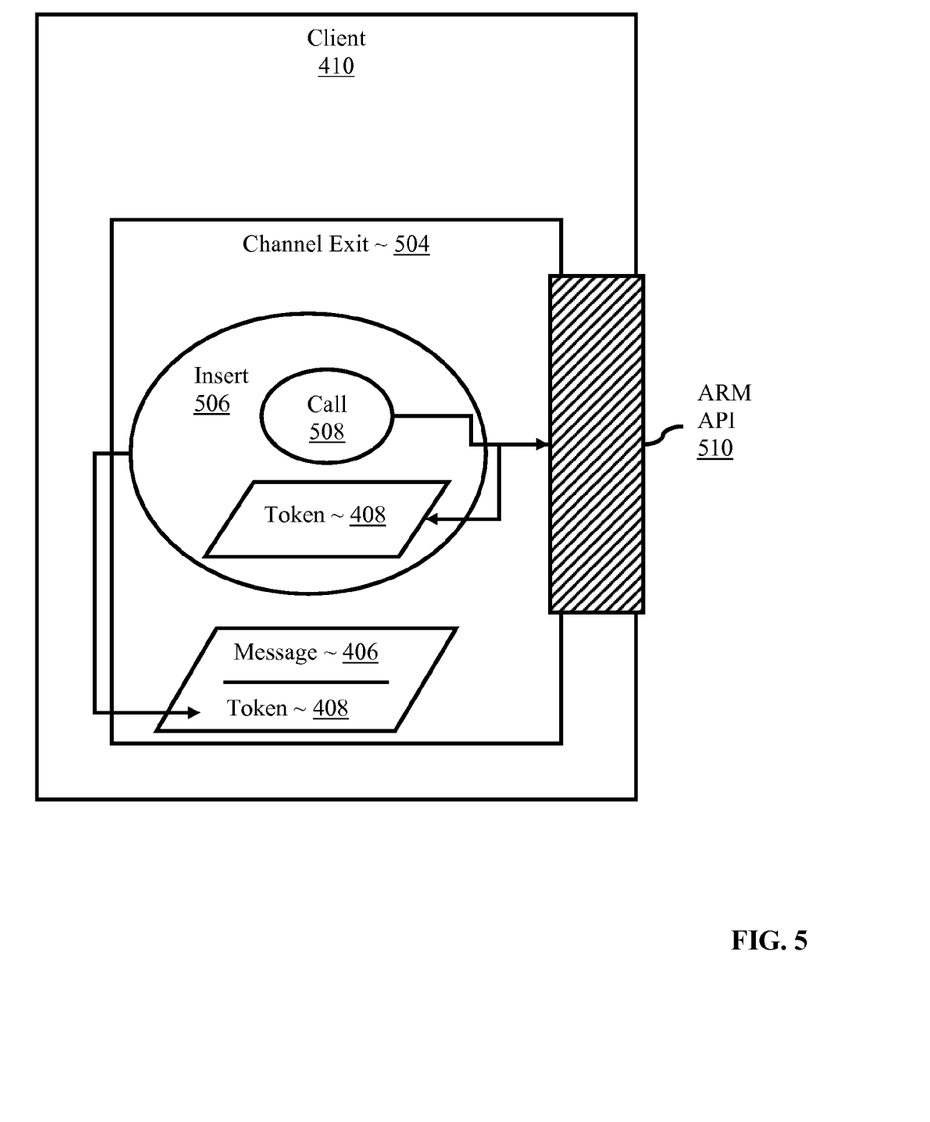
FIG. 5 sets forth a data flow diagram illustrating an exemplary method for inserting a monitoring token in a message by use of a channel exit running on a remote client device.

In the method of FIG. 5, inserting (506), with the channel exit (504) running on a remote client (410), the monitoring token (408) in the message (406) is carried out by calling (508) an ARM API (510). 'ARM' is an open API for Application Response-time Measurement useful in messaging monitoring that provides API's for obtaining measuring tokens, called 'correlators.' Invoking an arm_start( ) method call returns to the calling channel a correlator for insertion into the message.

Figure 6:
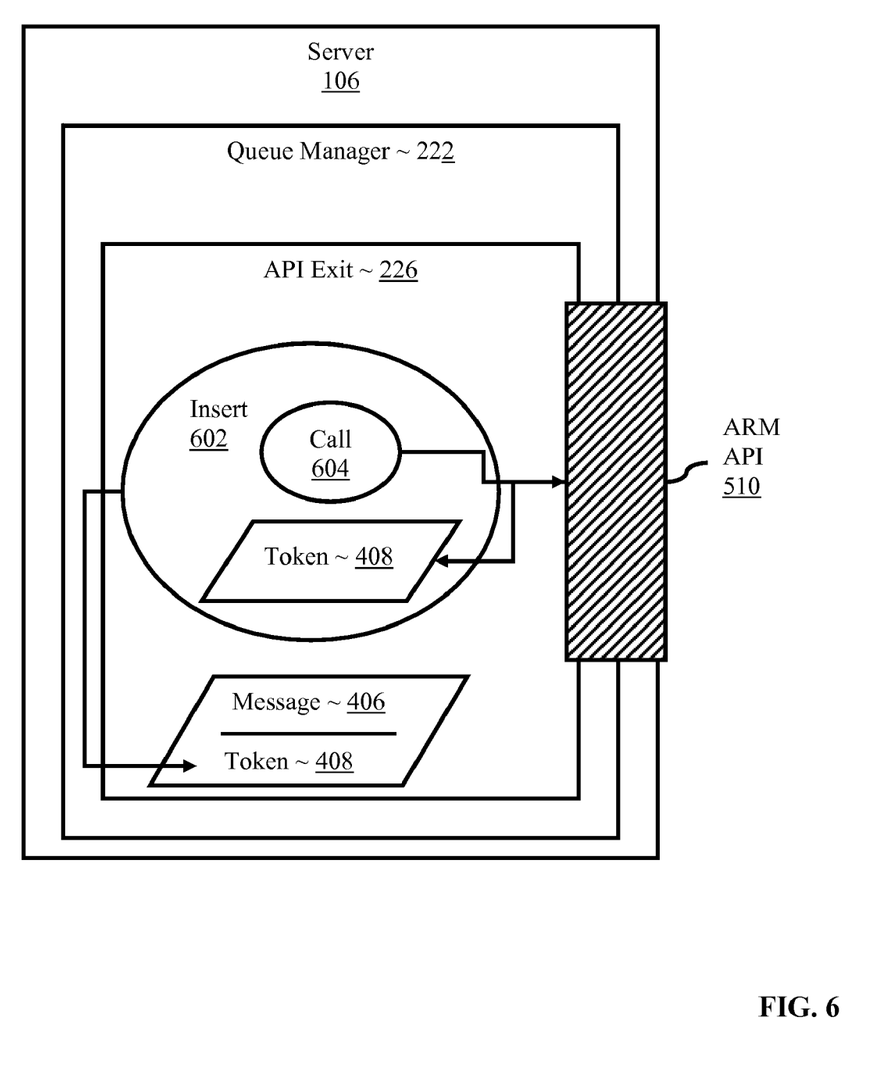
FIG. 6 illustrates another exemplary method for inserting a monitoring token in a message by use of an API exit running on a server.

As discussed above, inserting a monitoring token into a message may be carried out by a producing process running on either a client or a server. For further explanation therefore, FIG. 6 illustrates another exemplary method for inserting a monitoring token (408) in a message (406) by use of an API exit running on a server. The method of FIG. 6 includes inserting (602), with an API exit (226) running on the server (106), the monitoring token (408) in the message (406). An API exit is software running on the server that modifies a typical MOM call, such as a put call. For such modified put call issued by an application, the API exit is invoked to insert within the message a monitoring token.

In the method of FIG. 6, inserting (602), with the API exit (226) running on the server (106), the monitoring token (408) in the message (406) is carried out by calling (604) an ARM API (510). 'ARM' is an open API for Application Response-time Measurement useful in messaging monitoring that provides API's for obtaining measuring tokens, called 'correlators.' Invoking an arm_start( ) method call returns to the calling API exit a correlator for insertion into the message.

As discussed above, monitoring tokens are inserted at the source of the message and removed at the destination of the message. Continuing again with reference to FIG. 4: the method of FIG. 4 includes putting (402) the message (406) containing a monitoring token (408) on a queue (404) on a server (106). Putting (402) the message (406) containing a monitoring token (408) on a queue (404) on a server (106) is typically carried out by connecting to a queue manager on the server by invoking a method such as connectQueueMgr( ) and opening a queue by invoking a method such as openQueue( ). Once the queue is open, putting (402) a message (406) containing a monitoring token (408) on a queue (404) on a server (106) may be carried out by invoking a method such as put( ) to put the message on the queue and then closing the queue by invoking a method such as close( ).

The method of FIG. 4 includes receiving (414) a call to get (418) the message (406) from the queue (404) on the server (106). In a fashion similar to putting a message on a queue, getting the message (406) from the queue (404) on the server (106) is typically carried out by connecting to the queue manager on the server by invoking a method such as connectQueueMgr( ) and opening a queue by invoking a method such as openQueue( ). Once the queue is open, getting the message (406) from the queue (404) on the server (106) is typically carried out by invoking a method such as get( ) to get the message from the queue and then closing the queue by invoking a method such as close( ).

The method of FIG. 4 includes determining (422), with an API exit (226) running on the server (106), whether (422) the call to get (418) the message (406) is made by a process (230) running on a remote client (410) or by a process (220) running on the server (106). As discussed above, an API exit is software running on the server that is invoked by an MOM call, such as a get call. For such modified get call, the API exit is invoked to determine whether the call to get the message is made by a process running on a remote client or by a process running on the server (106).

One way of determining (422) whether (422) the call to get (418) the message (406) is made by a process (230) running on a remote client (410) or by a process (220) running on the server (106) is by determining whether a buffer passed as a parameter of the get call was manipulated by setting the first bit of the buffer as a flag indicating that the call was invoked by a remote client. In some embodiments, when a consuming process on a remote client device invokes a get( ) method to get the message from the queue, a channel exit on the remote client is invoked prior to executing the get call. The channel exit is programmed to manipulate a buffer passed as a parameter of the get call by setting the first bit of the buffer as a client flag. In many such embodiments, the channel exit is also programmed to modify the length of the buffer itself to accommodate the extra bit designated as a client flag. In such embodiments, prior to completing the get function call on the server side, and prior writing the message from the queue to the buffer passed as a parameter of the get call, the queue manager installed on server invokes an API exit. The API exit is programmed to determine whether the first bit of the buffer designated as a client flag is set. If the flag is not set, the API exit determines by default that that a process on the server itself made the call to get the message. If the flag is set, the API exit determines that a process on a remote client made the call to get the message.

If the call to get (418) the message (406) is made (426) by a process (220) running on the server (106), the method of FIG. 4 includes removing (430) the monitoring token (408) from the message (406) with the API exit (226). Determining that the call to get (418) the message (406) is made (426) by a process (220) running on the server (106) appropriately identifies that the consuming process is the destination of the message and therefore the monitoring token should be removed from the message.

If the call to get (418) the message (406) is not made (424) by a process (220) running on the server (106), the API exit (226) determines that the call to get (418) the message (406) is not made by a process running on the server and does not remove the monitoring token. In embodiments that include setting the first bit of a buffer as a client flag and modifying the length of the buffer to accommodate the extra bit, the API exit is programmed to restore the buffer length prior to passing the buffer of restored length to the queue manger on the server to write the message to the buffer.

The method of FIG. 4 also includes removing (428) the monitoring token (408) from the message (406) with a channel exit (504) running on the remote client (410), if the call to get (418) the message (406) is made (424) by a process (230) on the remote client (410). Determining that the call to get (418) the message (406) was made (424) by a process (220) running on the client and not a process running on the server (106) appropriately identifies that the remote client is the destination of the message and therefore the monitoring token should be removed from the message by a channel exit running on the remote client.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for monitoring messages in a distributed data processing system, the method comprising:
    putting a message containing a monitoring token on a queue on a server;
    receiving, by a queue manager, a call to get the message from the queue on the server;
    determining, with an Application Programming Interface (API) exit of the queue manager running on the server, whether the call to get the message is made by a process running on a remote client or by a process running on the server;
    if the call to get the message is made by a process running on the server, removing the monitoring token from the message with the API exit; and
    if the call to get the message is made by a process on the remote client, removing the monitoring token from the message with a channel exit running on the remote client.

2. The method of claim 1 further comprising inserting, with a channel exit running on the remote client, the monitoring token in the message.

3. The method of claim 2 wherein inserting, with a channel exit running on the remote client, the monitoring token in the message further comprises calling an Application Response Measurement (ARM) API.

4. The method of claim 1 further comprising inserting, with an API exit running on the server, the monitoring token in the message.

5. The method of claim 4 wherein inserting, with an API exit running on the server, the monitoring token in the message further comprises calling an ARM API.

6. A system for monitoring messages in a distributed data processing system, the system comprising a computer processor operatively coupled to computer memory, the computer memory including computer program instructions that, when executed by the computer processor, cause the computer processor to carry out the steps of:
    putting a message containing a monitoring token on a queue on a server;
    receiving, by a queue manager, a call to get the message from the queue on the server;
    determining, with an Application Programming Interface (API) exit of the queue manager running on the server, whether the call to get the message is made by a process running on a remote client or by a process running on the server; and
    if the call to get the message is made a process on the server, removing the monitoring token from the message with the API exit; and
    if the call to get the message is made by a process on the remote client, removing the monitoring token from the message with a channel exit running on the remote client.

7. The system of claim 6 further comprising computer program instructions that, when executed by the computer processor, cause the computer processor to carry out the step of inserting, with a channel exit running on the remote client, the monitoring token in the message.

8. The system of claim 7 wherein inserting, with a channel exit running on the remote client, the monitoring token in the message further comprises calling an Application Response Measurement (ARM) API.

9. The system of claim 6 further comprising computer program instructions that, when executed by the computer processor, cause the computer processor to carry out the step of inserting, with an API exit running on the server, the monitoring token in the message.

10. The system of claim 9 wherein inserting, with an API exit running on the server, the monitoring token in the message further comprises calling an ARM API.

11. A computer program product for monitoring messages in a distributed data processing computer program product, the computer program product comprising a non-transitory recordable storage medium and computer program instructions disposed upon the non-transitory recordable storage medium that, when executed by a computer processor, cause the computer processor to carryout the steps of:
putting a message containing a monitoring token on a queue on a server;
receiving, by a queue manager, a call to get the message from the queue on the server;
determining, with an Application Programming Interface (API) exit of the queue manager running on the server, whether the call to get the message is made by a process running on a remote client or by a process running on the server; and
if the call to get the message is made by a process on the server, removing the monitoring token from the message with the API exit; and
if the call to get the message is made a process on the remote client, removing the monitoring token from the message with a channel exit running on the remote client.

12. The computer program product of claim 11 further comprising computer program instructions disposed upon the recordable storage medium that, when executed by a computer processor, cause the computer processor to carry out the step of inserting, with a channel exit running on the remote client, the monitoring token in the message.

13. The computer program product of claim 12 wherein inserting, with a channel exit running on the remote client, the monitoring token in the message further comprises calling an Application Response Measurement (ARM) API.

14. The computer program product of claim 11 further comprising computer program instructions disposed upon the recordable storage medium that, when executed by a computer processor, cause the computer processor to carry out the step of inserting, with an API exit running on the server, the monitoring token in the message.

15. The computer program product of claim 14 wherein inserting, with an API exit running on the server, the monitoring token in the message further comprises calling an ARM API.

* * * * *